United States Patent [19]

Chiou

[11] Patent Number: 5,567,176
[45] Date of Patent: Oct. 22, 1996

[54] TWO-PURPOSE POWER SUPPLY DEVICE FOR COMPUTERS

[76] Inventor: Ming D. Chiou, 3F., No. 4, Alley 11, Lane 327, Sec. 2, Chung Shan Rd., Chung Ho City, Taipei, Taiwan

[21] Appl. No.: 359,763

[22] Filed: Dec. 20, 1994

[51] Int. Cl.⁶ ................................................ H01R 11/00
[52] U.S. Cl. ....................... 439/500; 439/218; 307/150
[58] Field of Search ................................... 439/500, 76.1, 439/956, 217, 218, 221; 307/149, 150, 151; 363/142, 143, 146

[56] References Cited

U.S. PATENT DOCUMENTS

| | | | |
|---|---|---|---|
| 3,201,742 | 3/1962 | English | 439/500 |
| 4,131,805 | 12/1978 | Austin et al. | 439/956 |
| 4,847,513 | 7/1989 | Katz et al. | 307/150 |
| 5,381,043 | 1/1995 | Kohiyama et al. | 307/150 |

*Primary Examiner*—Neil Abrams
*Assistant Examiner*—Brian J. Biggi
*Attorney, Agent, or Firm*—Pro-Techtor International

[57] ABSTRACT

A power supply device including a circuit board securely mounted inside a housing, an AC receptacle securely securely fixed to one side of the housing for connecting city power supply to the circuit board, an electric connector and a socket securely fixed to the housing and electrically connected in parallel to the DC output terminal of the circuit board for connection to the battery chamber of a mobile computer directly or the external power input socket of a mobile computer by a cable.

1 Claim, 5 Drawing Sheets

TWO-PURPOSE POWER SUPPLY DEVICE FOR COMPUTERS

BACKGROUND OF THE INVENTION

The present invention relates to a two-purpose power supply device which can be connected to the external power input socket of a mobile computer by a cable, or directly inserted into the battery chamber of a mobile computer to provide the necessary DC power supply.

The power supply for a mobile computer may be obtained from a rechargeable battery, or from city power supply through a power supply device. A mobile computer which uses battery power supply is free from the limitation of a stationary power supply. However, when the power of the battery drops below a certain value, the mobile computer become unable to work properly. If the power of the battery of a mobile computer is used up, it must be charged to the saturation state. Furthermore, conventional power supply devices are provided for connection to the external power input socket of a mobile computer, but they cannot be installed in the battery chamber of a mobile computer.

SUMMARY OF THE INVENTION

The present invention has been accomplished under the circumstances in view. It is the main object of the present invention to provide a power supply device which can be connected to the external power input socket of a mobile computer by a cable, or directly inserted into the battery chamber of a mobile computer to provide the necessary DC power supply.

According to the present invention, an electric connector and a socket are electrically connected in parallel to the DC output terminal of the circuit board so that the power supply device can be connected to the external power supply input socket of a mobile computer by the socket through a cable, or the battery chamber of a mobile computer by the electric connector directly.

DETAILED DESCRIPTION OF THE PREFERRED EMBODIMENT

Figure 1:
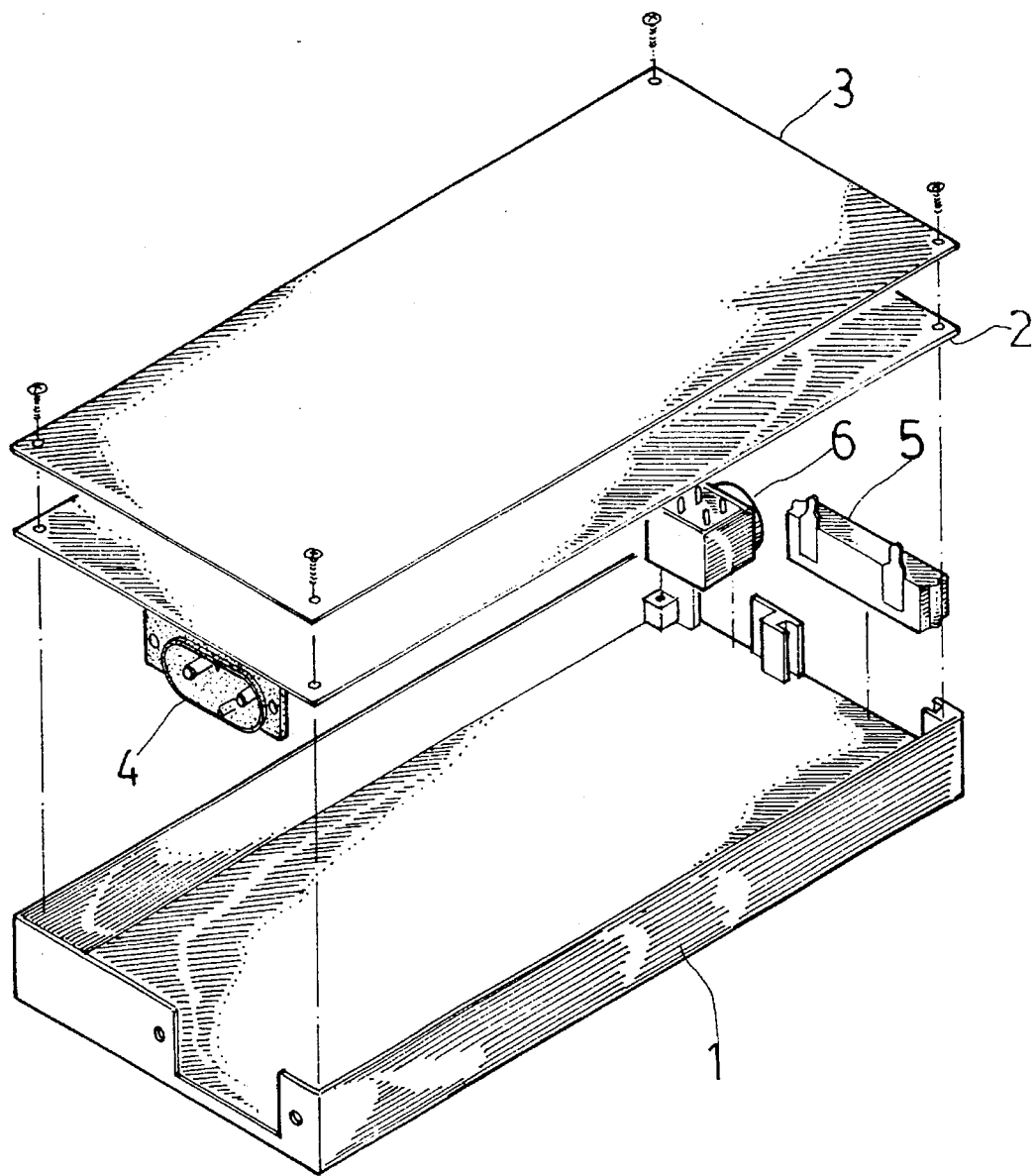
FIG. 1 is an exploded view of a power supply device according to the preferred embodiment of the present invention.
Figure 2:
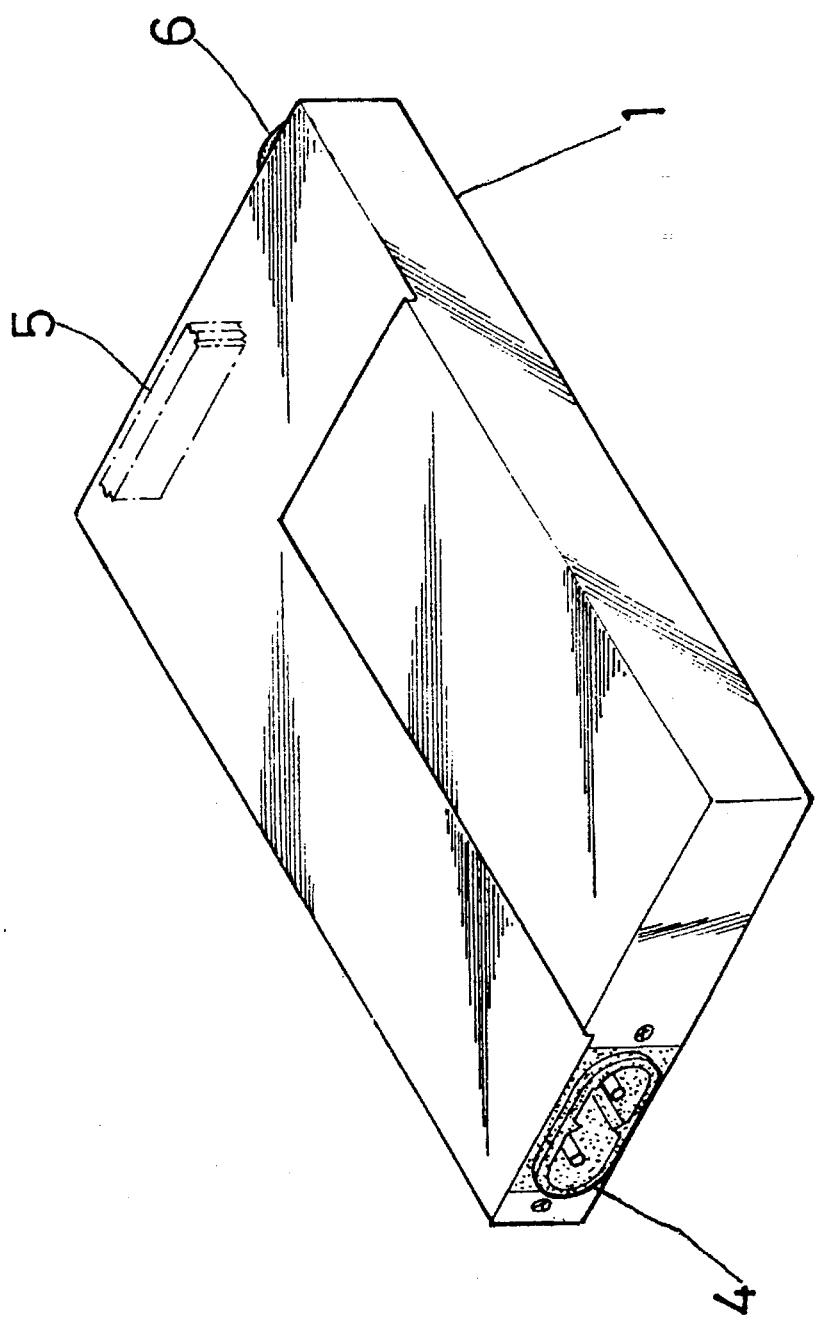
FIG. 2 is an elevational view of the power supply device of the preferred embodiment of the present invention.
Figure 3:
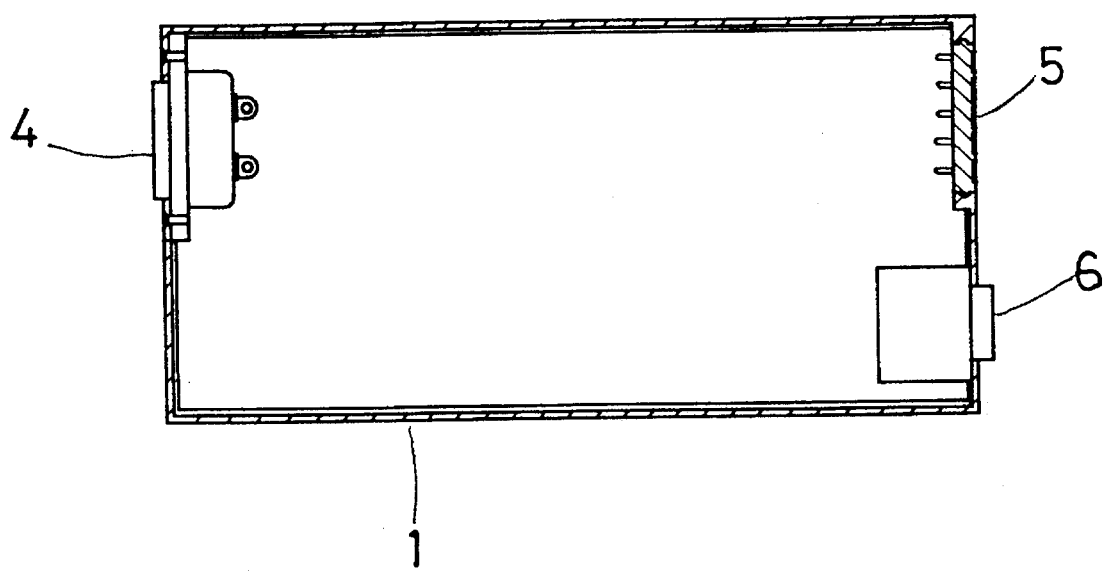
FIG. 3 is top view in section of FIG. 2.

Referring to FIGS. 1, 2, and 3, a power supply device in accordance with the present invention comprises a casing 1, a circuit board 2 securely fixed to the inside of the casing 1, a back cover 3 covered on the casing 1, and an AC receptacle 4 securely fixed to the casing 1 at one side and electrically connected to the circuit board 2 for connection to a power supply. The power supply device further comprises an electric connector 5 and a socket 6 securely fixed to the casing 1 at one side opposite to the AC receptacle 4 and electrically connected in parallel to the DC output terminal of the circuit board 2. The size of the casing 1 fits inside the battery chamber of a notebook computer so that the power supply device can be inserted into the battery chamber.

Figure 4:
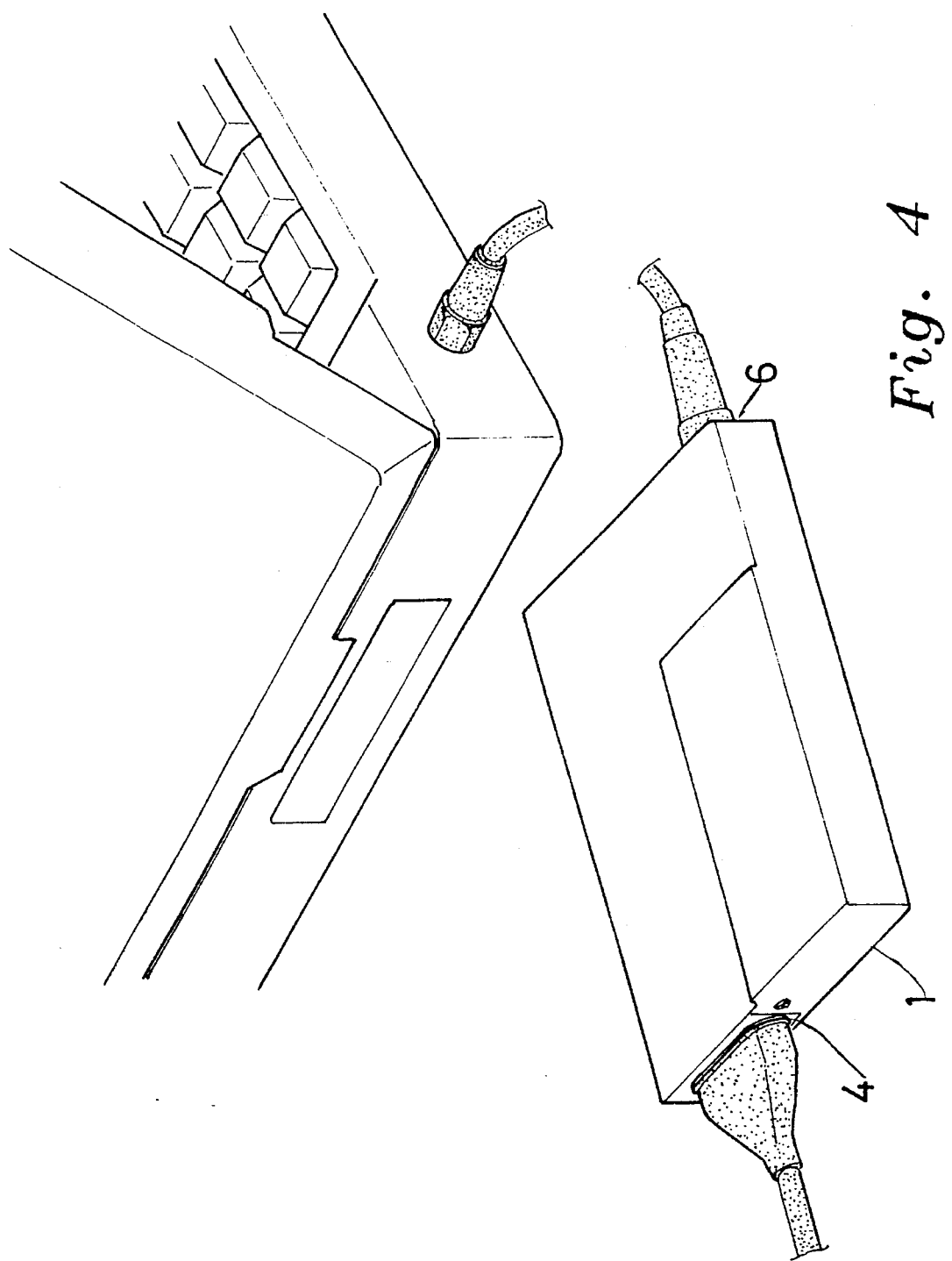
FIG. 4 is a view of the present invention, showing the power supply device externally connected to a notebook computer.

Referring to FIG. 4, the power supply device can be connected between a power supply and a notebook computer by connecting the AC receptacle 4 to a power supply and connecting the socket 6 to the power input socket on the notebook computer by a respective cable.

Figure 5:
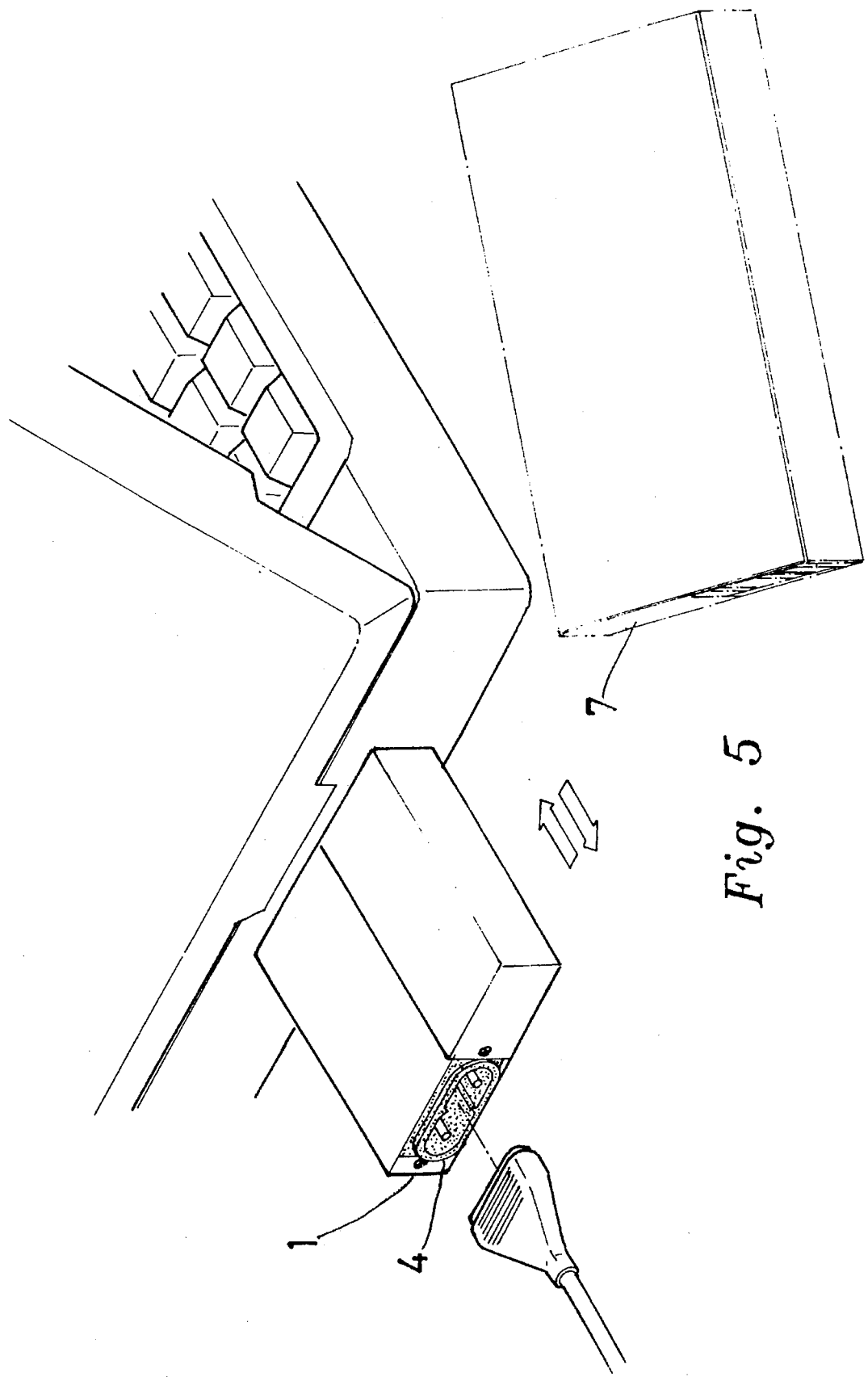
FIG. 5 is another view of the present invention, showing the power supply device inserted into the battery chamber of a notebook computer.

Referring to FIG. 5, when the power of the battery 7 of the notebook computer is used up, the battery 7 can be removed from the battery chamber of the notebook computer, and the power supply device of the present invention can be inserted into the battery chamber of the notebook computer to electrically connect the electric connector 5 to the battery power input connector inside the battery chamber of the notebook computer, and therefore DC power can be provided from the power supply device to the notebook computer.

As indicated, the power supply device of the present invention can be electrically connected to the external power input socket or battery chamber of a mobile computer to provide it with DC power.

What is claimed is:

1. A power supply device for use with a mobile computer having a battery chamber, the device comprising:
a housing, a circuit board securely mounted inside said housing, an AC receptacle securely fixed to said housing and electrically connected to said circuit board for connecting an AC power supply to said circuit board, wherein said circuit board has a DC output terminal connected in parallel with an electric connecter and a socket, said electric connector being securely fixed to said housing for electrical connection to the battery chamber of said mobile computer, said socket being securely fixed to said housing for connection to the external power input socket of said mobile computer by a cable, the size of said housing allowing said housing to be contained in the battery chamber of said mobile computer.

\* \* \* \* \*